C. F. HACKER.
BUTTER WORKER.
APPLICATION FILED MAR. 10, 1917.
1,231,731.
Patented July 3, 1917.
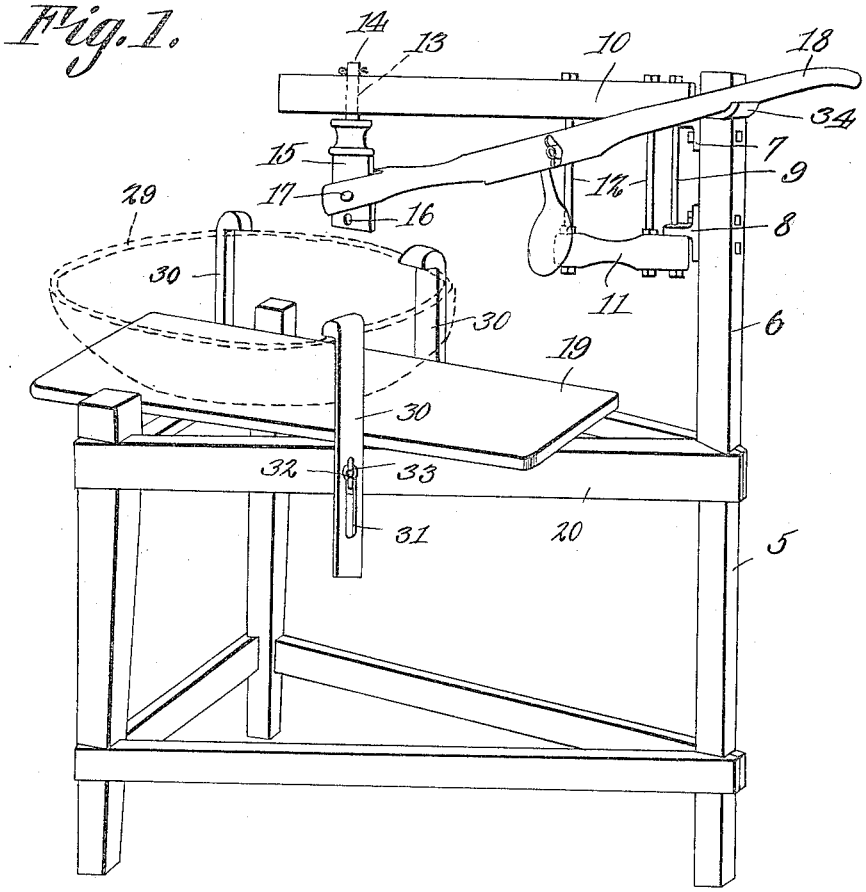
Fig. 1.
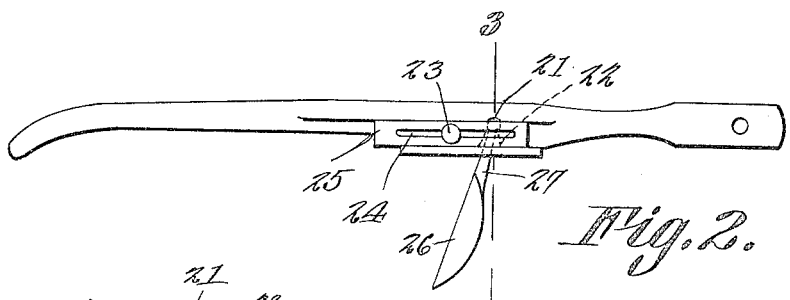
Fig. 2.
Fig. 3.
Inventor,
Charles F. Hacker,
By [signature]
Attorney

UNITED STATES PATENT OFFICE.

CHARLES F. HACKER, OF SCHODACK, NEW YORK.

BUTTER-WORKER.

1,231,731. Specification of Letters Patent. Patented July 3, 1917.

Application filed March 10, 1917. Serial No. 153,920.

*To all whom it may concern:*

Be it known that I, CHARLES F. HACKER, a citizen of the United States of America, and resident of Schodack, in the county of Rensselaer and State of New York, have invented certain new and useful Improvements in Butter-Workers, of which the following is a specification.

This invention relates to dairy machinery and particularly to butter workers.

An object of this invention is to provide novel means whereby a bowl or container is held in operative relation to a manually operated paddle or butter kneader, means being provided for manipulating the said paddle so that it will occupy a number of different positions with relation to the bowl, thus making it possible to work butter contained in the bowl.

A further object of this invention is to provide a handle having a swivel connection with respect to a support therefor, so that the said handle may be oscillated horizontally and vertically.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification, wherein like characters denote corresponding parts in the several views, and in which—

Figure 1 illustrates a view in perspective of a butter worker embodying the invention;

Fig. 2 illustrates a view in elevation showing the construction of the handle and the joint by which the paddle is secured thereto; and Fig. 3 illustrates a sectional view on the line 3—3 of Fig. 2.

In these drawings 5 denotes a frame having a standard 6, the said standard 6 being provided with brackets 7 and 8 through which a pivotal pin or bolt 9 extends. An arm 10 is mounted on the pivot 9 at the upper end thereof, and a short arm 11 is mounted on said bolt at the lower end thereof, the said arms 10 and 11 being connected by brace rods 12, so that the arms may swing with relation to the brackets 7 and 8 and the arm 10 will be held approximately horizontally.

Near the outer end of the arm 10, there is an aperture 13 which receives the shank 14 of the head 15, the said head 15 having apertures such as 16 for the reception of a pivotal pin 17 on which an operating handle 18 may oscillate. The purpose of the aperture 16 is to afford an adjustment of the handle so that it may be supported in an elevated or lowered position with respect to a slab 19 which is supported by the frame 20.

One side of the handle is provided with a substantially spherical recess 21 and a flared slot 22 communicating with the spherical recess. A bolt or fastening device 23 extends through the handle and through a slot 24 of the plate 25, which plate is slidably secured on that side of the handle containing the recess, so that the said plate covers a portion of the spherical recess and the whole of the slot 22.

A paddle 26 terminates in a neck or handle 27 and the said handle has an enlarged end 28 which is of a configuration to fit in the spherical recess, wherein the end of the handle is held so that it will be free to move to permit the paddle to oscillate or rotate as the handle is manipulated. As the said paddle is free to rotate and as it will be deflected to a greater or less extent as butter is being worked, the movement afforded the paddle will result in its being very efficient to remove the liquid from the butter so that the density of the butter will be speedily increased.

A bowl 29 may be held on the slab 19 by clamps 30, one of which is fully shown in the drawing and it will be understood that the other clamps are of the same construction. Each clamp has a slotted portion 31 which receives a bolt 32 so that the said clamp may be moved vertically or it may be swung on the bolt so that the clamp will be free of the edge of the bowl. When it is desired to clamp the bowl in place on the slab, the heads of the clamps are brought into engagement with the edge of the bowl and after being pressed to firmly engage the edge of the bowl, the nut 33 on the bolt is screwed to bind the clamp to hold it in place.

A bracket 34 is carried by the post and is adapted to engage the handle for the purpose of holding it in elevated and inoperative position when not in use.

Owing to the freedom of movement of the arm 10 and its capacity to swing on its pivot 9 and the universal movement afforded the handle, due to its means of connection to the said arm 10, different movements may be imparted to the handle 18 for the purpose of manipulating the paddle for the purposes stated.

When the paddle is to be applied to the handle, it is only necessary to release the plate and slide it so that it will clear the spherical opening and the slot in the handle to permit the application of the enlarged end of the paddle extension to the said spherical recess after which the plate may be slid to cover the spherical recess and slot and hold the paddle in place.

I claim—

1. In a butter worker, a frame, a standard supported thereby, an arm, means for pivotally connecting the arm to the standard, a head having an extension swiveled in the arm, a handle pivotally connected to the said head, said handle having a spherical recess and a flared slot, a paddle having an extension with an enlarged end fitting in the spherical recess, and a plate covering the said spherical recess for holding the paddle in place.

2. In a butter worker, a frame, a standard supported thereby, an arm, means for pivotally connecting the arm to the standard, a head having an extension swiveled in the arm, a handle, means for pivotally connecting the handle to the head, said handle having a recess and a flared slot communicating therewith, a plate for covering the said recess and slot, means for holding the plate on the handle, a paddle having an extension lying in the slot and an end lying in the recess, said paddle being oscillatable and rotatable with relation to the handle, and a receptacle for butter with relation to which the paddle is manipulated.

3. In a butter worker, a frame, a standard supported thereby, an arm, means for pivotally connecting the arm to the standard, a head having an extension swiveled in the arm, a handle, means for pivotally connecting the handle to the head, said handle having a recess and a flared slot communicating therewith, a plate for covering the said recess and slot, means for holding the plate on the handle, a paddle having an extension lying in the slot and an end lying in the recess, said paddle being oscillatable and rotatable with relation to the handle, a receptacle holder comprising a slab resting on the frame, and clamps carried by the frame for engaging an edge of a receptacle for holding it on the slab.

CHARLES F. HACKER.

Copies of this patent may be obtained for five cents each, by addressing the "Commissioner of Patents, Washington, D. C."